United States Patent Office 3,467,176
Patented Sept. 16, 1969

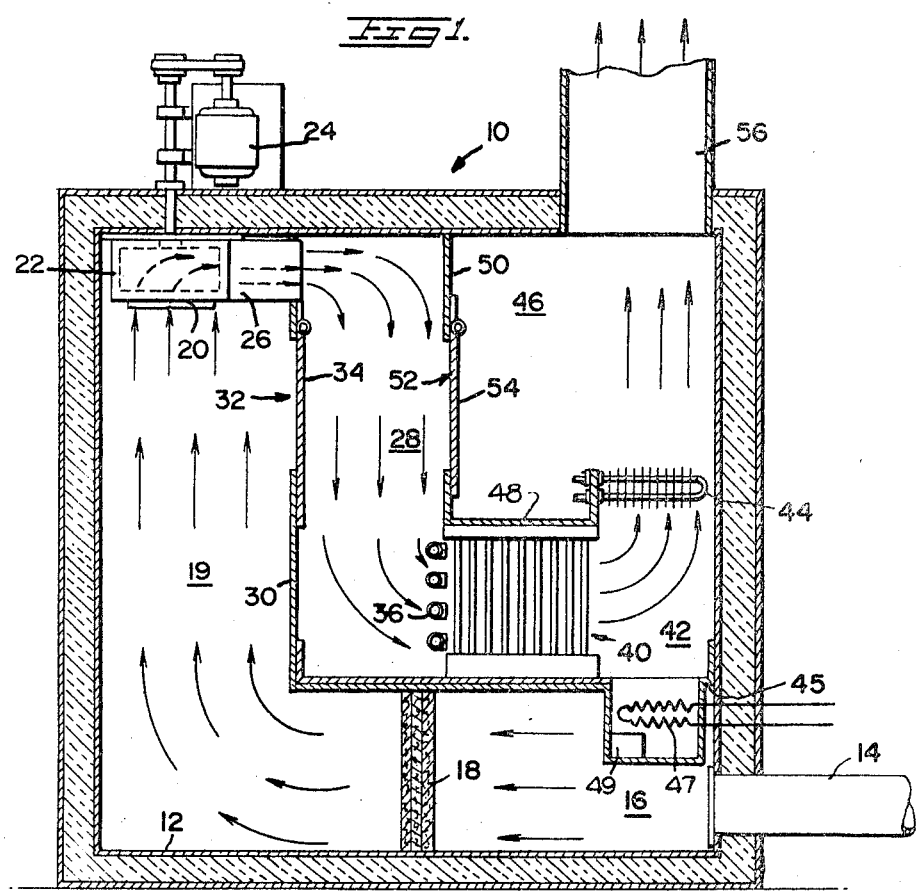
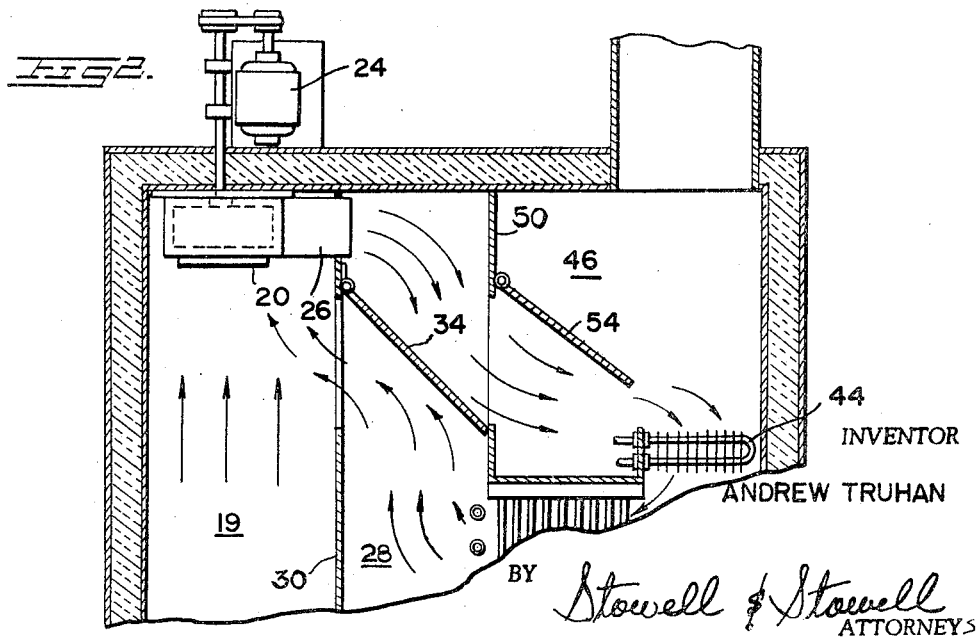

3,467,176
GAS CONDITIONING APPARATUS FOR
CONTROLLED ENVIRONMENT
Andrew Truhan, R.D. 3, Box 392T,
Somerset, N.J. 08873
Filed Jan. 24, 1968, Ser. No. 700,289
Int. Cl. F25b 29/00; F28f 27/02
U.S. Cl. 165—17                  5 Claims

ABSTRACT OF THE DISCLOSURE

A gas conditioning apparatus for a controlled (isolated) environment. The apparatus includes—(a) cooling, (b) heating—means in the flow path from ambient air to the isolated environment. A pair of flapper vanes is displaceable to effect defrosting of the cooling coils, by reversing the gas flow direction over a portion of the flow path.

---

This invention relates to apparatus for closely controlling atmosphere conditions within isolation chambers. Rather close control of temperature, relative humidity, ion content, and the like is required in a variety of endeavors, both commercial and experimental or academic. For example drug development efforts of the pharmaceutical industry sometime require certain molds and bacteria cultures to be grown in chambers whose atmospheres must be very closely controlled for optimum growth or for control of experimental parameters. In the assembly of certain miniature mechanical and electrical systems, such as space rockets and the like, as another example, the atmosphere in which such operations are carried out must be carefully controlled in order to preclude not only the entry of foreign particles such as dust into such enclosures but also to realize certain values of temperature, relative humidity and the like which are more favorable than others for assembly. Yet another example wherein such apparatus exhibits utility is in the care of those critically ill, i.e., the provision of a controlled atmosphere to enhance the treatment of persons suffering from acute attacks of various diseases, as well as prematurely born infants. From these examples, the reader will readily comprehend that apparatus for closely controlling environmental conditions exhibits utility in a variety of situations and conditions.

In general, environmental control gas (air) conditioning apparatus includes a fan which draws air in from an area or source of supply and serves to carry it along a flow path for final delivery into the area or chamber whose atmosphere is to be controlled. Along the flow path a variety of gas treating elements are often to be found. For example, generally encountered are filters, humidifiers, dehumidifiers, heating coils, cooling coils, ionizing means, bactericide means, etc. In several ways these elements treat the incoming gases in sequences generally determined by the precise nature of the operation which is to occur or is to be performed in an isolated, controlled environment chamber.

This invention is particularly concerned with the construction of environmental control apparatus where cooling coils are susceptible of defrosting. Particularly in those applications of a controlled environment atmosphere which require the controlled atmosphere to be relatively high in moisture content, any cooling coils which are placed in the flow path will generally become encrusted with ice crystals, the crystals gradually building up so as to define not only a formidable blockage but also to minimize the effectiveness of the temperature lowering function of the cooling coils.

By the practice of this invention, the flow path through the cooling coils of the apparatus is reversed. Such reversal is accomplished by a swinging vane arrangement. A pair of swinging vanes is actuated and the refrigerating fluid withdrawn or its circulation in the cooling coils stopped. Thus the use of auxiliary devices, such as special fans for defrosting, need not be employed.

The prior art is aware not only of gas conditioning apparatus for isolated environment control, but also is aware of defrosting arrangements. Examples of the latter may be seen in the following United States patents: Dunbar, 2,896,425; Kocher, 3,115,017; Cumming, 2,265,634; and Ringquist 2,481,348. As a typical representation of prior art arrangements the above mentioned Kocher et al. construction relates to a defrosting arrangement wherein relatively warm air is exteriorly drawn into a refrigerated enclosure by an auxiliary fan. A pair of dampers or vanes is employed, these elements assuming a first or normal configuration and then assuming a second configuration when defrosting is desired.

The subject invention is an improvement in certain respects over these and over other known defrosting arrangements as will become evident from the following more detailed disclosure and description of this invention.

In the drawings:

FIGURE 1 is a partially schematic plan view of the environment control gas conditioning apparatus according to this invention and illustrating the position of certain damper elements during steady state or normal flow.

FIGURE 2 is a view similar to FIG. 1 and showing the change of position of these damper elements in the defrost and flow reversing direction.

Turning now to FIG. 1 of the drawings, the numeral 10 denotes generally the gas conditioning apparatus of this invention which is particularly adapted for the critical control of certain gas parameters such as relative humidity and temperature, as is often required for isolated environment purposes. In general, the apparatus 10 is defined by a housing formed of spaced, insulated sheet metal walls 12 within which are positioned the elements about to be described. The numeral 14 denotes an intake duct feeding into a plenum chamber 16. Within chamber 16 a plurality of filters 18 is generally positioned and is supported by brackets or ways whose precise details of construction are well known to workers in this art and which form no part of the present invention. Upstream of the filter plenum 16 a second plenum 19 leads into the central intake 20 of a centrifugal rotary fan 22. A motor 24 drives the fan and is mounted adjacent to and may be supported by the walls 12. The peripheral output orifice 26 of the fan empties into the top of a plenum 28. It will be observed that a wall 30 separates plena 19 and 28, the wall provided with an opening 32 therein. Pivoted at one portion of wall 30 a first vane or damper 34 is positioned as illustrated in its steady state position, i.e., that position which precludes fluid communication between plena 19 and 28 through opening 32. A plurality of moisture injecting sprays indicated generally by the numeral 36 (four such nozzles or sprays are illustrated) is positioned in the lower portion of plenum 28. The sprays are immediately upstream of cooling coils denoted generally the numeral 40 and which are positioned in plenum 42. The cooling coils may assume one of many specific configurations and may possess any one of several external surface designs, all of which are well known and which form no part of the present invention. The cooling coils 40 are part of a conventional refrigeration system which includes in addition to the cooling coils 10, a compressor, a condenser and a receiver, along with associated valves and control devices. These latter elements have not been illustrated because of their familiarity by those versed in this art.

The upper portion of plenum 42 receives a reheating coil schematically designated by the numeral 44. In practice the reheating coil is defined by one or more turns of finned tube stock through which passes a heating fluid, often a liquid. The apparatus which controls the temperature of the fluid passing through the coil 44 is not illustrated, being well known to workers in the thermal conditioning arts. In general, a variety of constructions for the reheating coil 44 may be employed, as for example, an electrical coil instead of the tubular finned coil just described. The precise controls for electrical current regulation through the electrical modification of such a coil 44 is well known and hence not shown.

A plenum chamber 46 is located upstream of the reheating coil 44 and separated from plena 42 and 28 by wall portions 48 and 50. It will be observed that an aperture 52 is carried by wall 50 and a second damper or vane is here designated by the numeral 54, suitably mounted for swinging movement on a part of wall 50. The numeral 56 schematically denotes an exhaust duct adapted to feed into an isolation chamber which may assume any one of the previously mentioned forms. In general, the particular size and volumetric flow requirements of a given isolation chamber have no effect upon the general principles of operation of this apparatus.

The numeral 45 schematically denotes a drip pan or receptacle for receiving moisture which condenses from the cooling coils 40, and runs off from the spray devices 36 hereinbefore described. The pan 45 may contain a thermostatically controlled electrical heater 47 to maintain the temperature of the liquid to be sprayed at the desired temperature to obtain the desired moisture content and temperature of the air passing to the cooling coils 40. Pan 45 may also house a motor and pump unit generally designated at 49 to pump the fluid from the pan to the spray means 36. When the fluid for the spray means 36 is provided from the pan, suitable means not shown are provided to maintain a predetermined liquid level in the pan. As is known in the refrigeration arts, the amount of moisture which air, for example, can hold without precipitation diminishes with diminishing temperatures. Accordingly, the cooling of air passing through coil 40 is often accompanied by precipitation out of the now supersaturated gas. Suitable ducts may carry away excess moisture from the pan or receptacle 45.

Considering now the conditions which obtain in the apparatus of FIG. 1 during normal or steady state operation, air, generally ambient air, is received by duct 14 and passes through filters 18 in plenum chamber 16. The filters perform the function of removing particulate material such as dust from the ambient air and a variety of filters adapted to contact different sized particles from the air may be employed. After passing through the filters, the gas now passes upwardly through plenum 19 under the exhaust action of centrifugal fan 22 by virtue of the slight vacuum existing at the intake 20 of fan 22. The air exits from outlet 26 into the top portion of plenum chamber 28 and thence may be moistened by the action of sprays 36. Thereafter, the now moistened air passes through cooling coils 40 in plenum chamber 42 and, as explained above, this flow may be accompanied by slight or moderate precipitation of moisture from the air into the receptacle 45. The gas now passes upwardly and is heated by the action of reheater coil 44. From this point the now fully conditioned air passes into plenum chamber 46 and thence through duct 56 into an isolation chamber. In practice, a variety of temperature and humidity sensing elements are disposed at various portions throughout the flow path just described. These sensing devices are coupled, in well known manners, to the conditioning elements just described by means of any one of a great variety of feed back circuits, control circuits and the like. However, the precise location of such sensing elements and control circuits and systems has not been illustrated as not necessary for a full understanding of this invention. Further, additional gas treating devices such as ultraviolet lamps may be included in the path.

Referring now to FIG. 2 of the drawings, the change of position of damper elements 34 and 54 will be readily apparent. It is to be noted in particular that the vane 34 now abuts a portion of wall 48 to thereby preclude fluid communication between the upper and the lower portions of plenum 28. The limit of travel of vane 54 in its open position is, however, not critical.

This configuration of vanes 34 and 54 is chosen whenever the coil 40 is to be defrosted. Under these circumstances, with vanes 34 and 54 in the illustrated position, the flow path is as follows: air flows in through intake duct 14 and is drawn along plenum 19 into the intake 20 of fan 22. From the exhaust 26 of fan 22, the flow is down plenum 28 towards sprays 36, but strikes one surface of vane 34 and thence passes through aperture 52 in wall 50. The flow is then through the reverse direction of reheating coil 44 and thence downwardly into the right portion of plenum 42. The flow then continues in a reverse direction through cooling coils 40, thence to the lower portion of plenum 28 and thence leftward through opening 32 of wall 30. In general, while some air will enter duct 14 during the defrosting operation, the majority of the circulated air is in a relatively closed path, the path above described. During this time, the duct 56 to the isolation chamber is closed as by means of a suitable valve. The warm air from reheating coil 44 thus defrosts the cooling coil 40 without the use of an additional or auxiliary fan.

The vanes 34 and 54 may be manually opened to affect the reverse circulation of the air flow or the vanes may be connected to actuators controlled by sensors positioned at, for example, the coils 40 or the actuators may be controlled by a simple timer which would provide for reverse flow a certain percent of a predetermined operating period.

In the claims which follow, the reader will observe that the plena which are recited therein are not necessarily the same as those described in the above specification, the latter being more numerous.

What is claimed is:
1. An apparatus for critically controlling the gaseous atmosphere within an isolation chamber including:
 (a) a housing having a gas flow path therein, said path including a generally serpentine portion having at least two adjoining runs through which gas is adapted to pass in opposite directions,
 (b) means for creating a pressure differential along a portion of said path to cause a gas to traverse the path,
 (c) means positioned along said path for conditioning said gas,
 (d) said (c) means including a heating element and a cooling element,
 (e) said elements being spaced along said path, to thereby sequentially cool and heat gas,
 (f) means for reversing the flow of gas over that portion of said flow path between and including said heating and cooling elements.

2. An apparatus for critically controlling the gaseous atmosphere within an isolation chamber including:
 (a) a housing having a gas flow path therein,
 (b) a fan positioned in said gas flow path, said fan having an intake and an exhaust,
 (c) a first plenum, communicating with said fan intake,
 (d) a second plenum serially coupled to said first plenum through said fan,
 (e) said second plenum having a cooling element therein,
 (f) a third plenum serially communicating with said second plenum chamber,
 (g) said first, second and third plena being coextensive with said flow path,
 (h) a first damper whose movement establishes communication between said first and second plena,
 (i) a second damper whose movement establishes communication between the terminus of the second plenum and the exhaust of said fan through the third plenum, (j) whereby movement of said first and second dampers effects a reversal of flow direction in said second plenum.

3. The apparatus of claim 1 wherein:
(a) said means (f) includes a damper movable between two positions to establish fluid communication between said adjoining runs of said flow path.

4. The apparatus of claim 2 wherein:
(a) said first damper upon its said movement precludes direct communication through said second plenum between the exhaust of said fan and said cooling element in said second plenum.

5. The apparatus of claim 4 including:
(a) a heating element,
(b) said heating and cooling elements being spaced apart from each other along said flow path, (c) said cooling element positioned in said second plenum,
(d) said heating element positioned in said third plenum.

References Cited

UNITED STATES PATENTS

| 1,853,459 | 4/1932 | Russell et al. | 165—97 |
| 2,021,583 | 11/1935 | Whiteley | 165—48 |
| 2,263,476 | 11/1941 | Sunday | 165—29 |
| 3,139,924 | 7/1964 | Schreiner | 62—325 |
| 3,157,227 | 11/1964 | Palmer | 165—29 |
| 3,194,305 | 7/1965 | Moore | 98—33 |

ROBERT A. O'LEARY, Primary Examiner

CHARLES SUKALO, Assistant Examiner

U.S. Cl. X.R.

165—97